Jan. 11, 1938.  B. L. QUARNSTROM  2,104,884
HIGH PRESSURE TUBE AND METHOD OF MAKING SAME
Filed Sept. 24, 1934    2 Sheets—Sheet 1
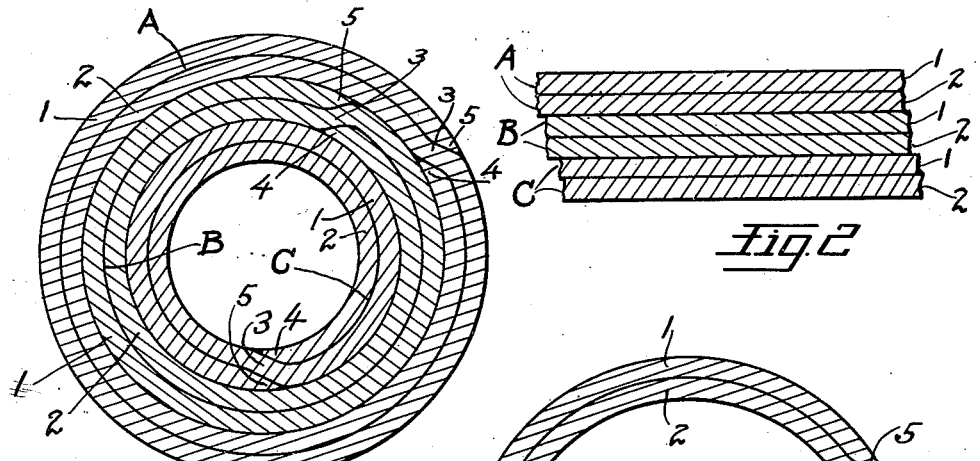
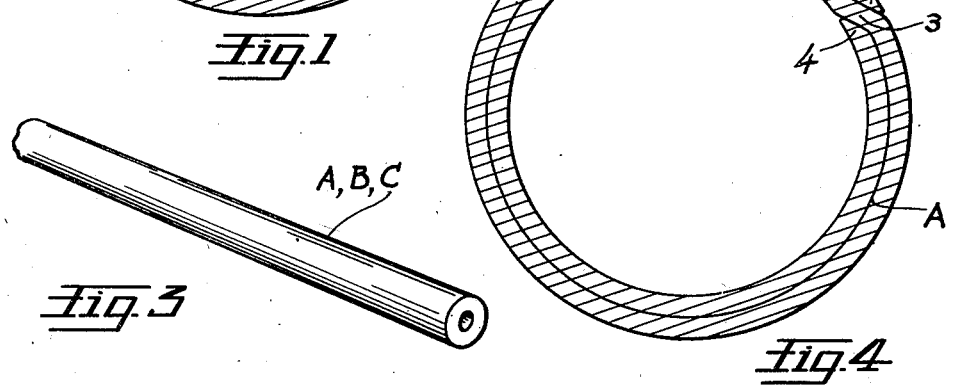
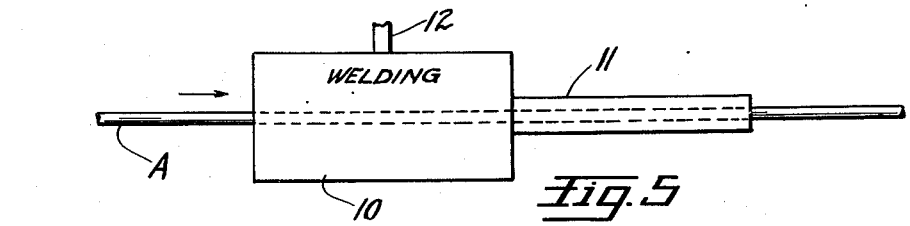
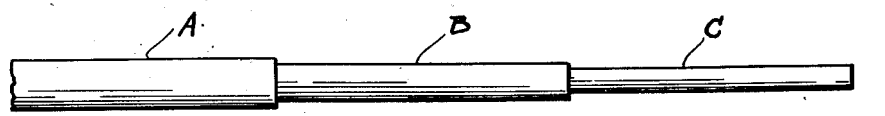
INVENTOR.
BERT L. QUARNSTROM
BY
Barnes, Kisselle, Laughlin & Raisch
ATTORNEYS.

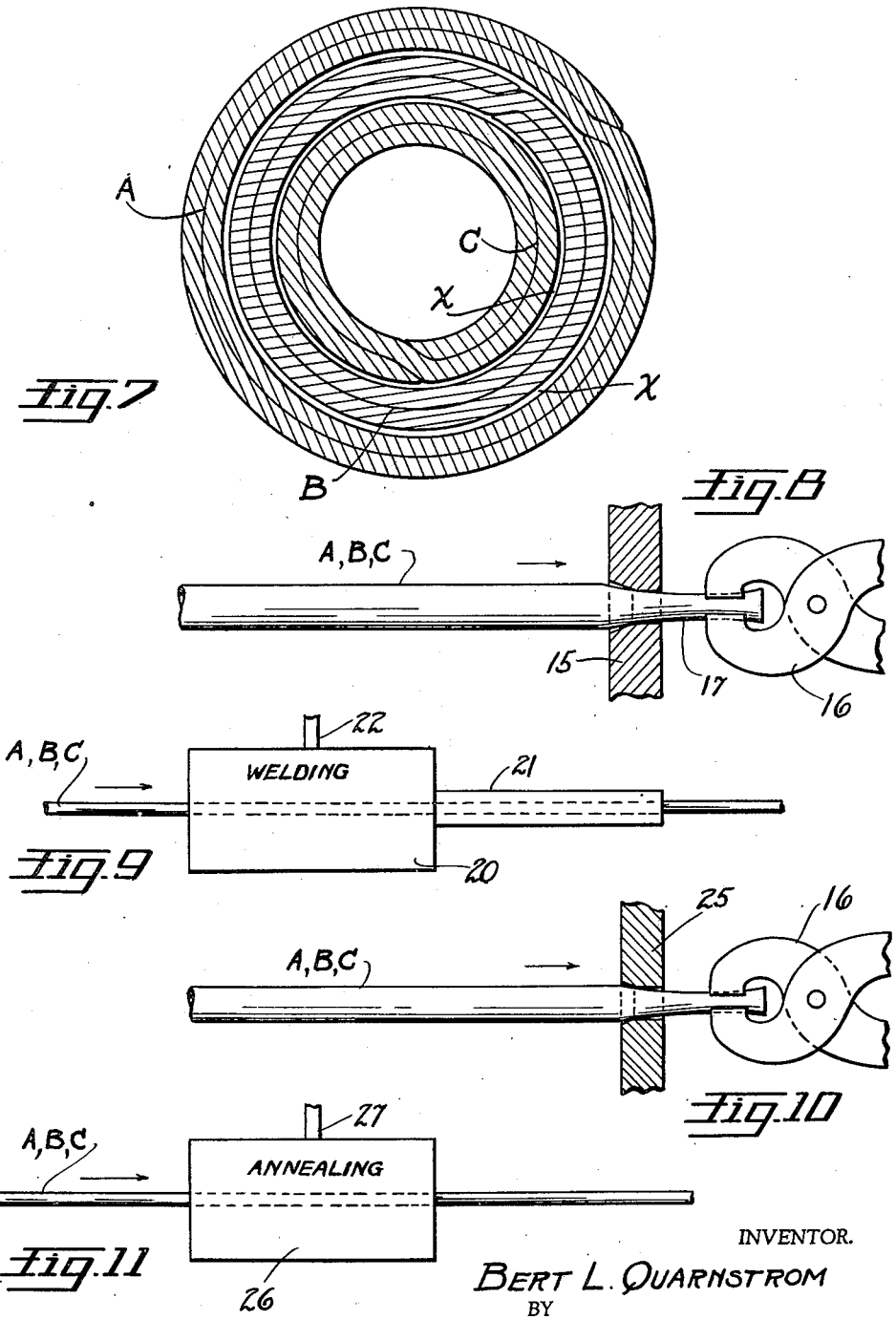

Patented Jan. 11, 1938

2,104,884

UNITED STATES PATENT OFFICE 2,104,884

HIGH PRESSURE TUBE AND METHOD OF MAKING SAME

Bert L. Quarnstrom, Detroit, Mich., assignor to Bundy Tubing Company, Detroit, Mich., a corporation of Michigan Application September 24, 1934, Serial No. 745,213

8 Claims. (Cl. 29—188)

This invention relates to a high pressure tube and to a method of making the same. The invention is directed particularly to the making of small tubing capable of withstanding high internal pressures such as for example the pressures encountered in the fuel lines of Diesel engines.

More particularly, the invention is concerned with tubing, the wall thickness of which is relatively great as compared to the cross-sectional measurements of the tube, both as to outside and inside diameters. In tubes intended for use with high pressures there must be an ample safety factor, and in addition to the heavy wall structure, it is highly desirable that the wall be uniform as to thickness and uniform as to property to thus obviate weaknesses at various locations in the tube wall. In carrying out the invention, two or more tubes of different sizes are disposed in telescoping relation, and the telescoping tubes are then drawn to decrease the size, and as this is performed by the present invention a strong substantially solid wall structure is obtained. Preferably, each of the two or more tubes which are telescoped one within the other is in itself a complete sealed tube. The several tubes, which are telescoped and drawn to produce the final product, are made from strip stock, such as low carbon steel, fashioned into tubular form and preferably united with fused metal, as for example copper or a copper alloy. To this end the strip stock may be and preferably is copper coated before being fashioned into a tube, and is then subjected to heat so that the copper coating is melted to copper weld overlapping parts together. This much of the process may be carried out by subjecting the tubes to copper melting temperature under conditions which substantially prevent oxidation of the copper and which is such that the copper coating is maintained on the tube surfaces. The several tubes thus formed, being of different sizes, are such as to telescope within each other, and then they are drawn to reduce the over all diameter so as to bring the inside and outside surfaces of the telescoping tubes into tight contact with each other.

This tube structure may then be a second time subjected to copper melting temperature under conditions designed to preclude oxides, and the copper coatings are rendered molten and serve to unite the several telescoping tubes. By thus forming the thick walled tube from several telescoped tubes made from strip stock, uniformity of wall thickness is obtained and uniformity of the wall structure as to other properties is assured. The invention and its objects will be better understood as the following detailed description is considered in connection with the accompanying drawings.

Fig. 1 is an enlarged cross-sectional view of a tube constructed in accordance with the invention.

Fig. 2 is a longitudinal sectional view substantially on line 2—2 of Fig. 1.

Fig. 3 is a perspective view of a length of tubing showing the general appearance of the completed article.

Fig. 4 is an enlarged sectional view of one of the two or more completed tubes which are telescoped within each other, and illustrating one form of tubing which may be employed.

Fig. 5 is a diagrammatic view illustrating the manner in which the several tubes to be telescoped together may be made.

Fig. 6 is a view illustrating three tubes to be telescoped together.

Fig. 7 is an enlarged cross-sectional view of the three tubes prior to being drawn in size.

Fig. 8 is a diagrammatic view illustrating the beginning of the drawing operation.

Fig. 9 is a view similar to Fig. 5 showing a furnace for heat treating the drawn telescoped tube structure.

Fig. 10 is another diagrammatic view illustrating a further drawing step which may be employed following the heat treating and welding step illustrated in Fig. 9.

Fig. 11 is a diagrammatic view illustrating a final heat treating of the tube to anneal the same.

The tubes which are telescoped within each other, as stated above, are made from strip stock fashioned into hollow cross-sectional form, and they may be of the same general structure or may vary as to structure. One form which the tubes may take, and this is the preferred form, is what has become known in the trade as "Bundy" tube, which comprises a strip of stock fashioned through substantially 720° to form a double walled tube with an off-set in the stock between the edges of the stock. The strip stock is preferably of low carbon steel, although other metals may be used, and inasmuch as the invention herein contemplates drawing operations the sealing metal should be of a metal capable of being drawn as much or more than the strip stock metal so that drawing operations will not impair the joints, seams or coating; to this end, tubes made from strip steel stock and sealed with copper may be used. Tube of this nature is covered by the Harry W. Bundy Patent No. 1,930,191 of October 10, 1933, and the process for making the same is covered in the Harry W. Bundy Patent No. 1,892,607 of December 27, 1932. While this is a preferred type of tubing used in carrying out the present invention, the tube structure may vary and may have different types of seams—one type, for example, being that shown in the Bert L. Quarnstrom Patent No. 1,933,279 of October 31, 1933.

Only one type of tubing used in the making of the final product of this invention is shown herein, and that is the so-called "Bundy" tube. Such a tube is illustrated in Fig. 4, having an outside wall 1, an inside wall 2, an off-set 3 disposed between the adjacent edges of the stock which are preferably beveled as shown in order to avoid an abrupt angle in the off-set, the edges being shown at 4 and 5. This tube, fashioned from copper coated steel strip stock, is completed by heating the same to melt the copper, preferably under conditions precluding oxides, to copper weld the plies together. The copper alloys with the underlying ferrous metal and effects a strong bond, which in some cases has proven to be stronger than the steel strip itself. Fig. 4 shows an outside tube which is generally referenced A; and in order to complete the disclosure herein, Fig. 5 has been prepared to diagrammatically illustrate the method of treating the tube. In this figure the tube A is moved longitudinally through a furnace 10, heated sufficiently to melt the copper, and the tube passes through a cooler 11, the movement being from left to right as Fig. 5 is viewed. A non-oxidizing gas or reducing gas may be supplied to the furnace through an inlet 12, and the same may escape and burn at the entrance end of the furnace and at the outlet end of the cooler.

Fig. 1 shows a completed tube made up of three tubes of the type illustrated in Fig. 4, the outside tube being labelled A, the intermediate tube B and the inner tube C. Tubes B and C may be completed by passing them through a furnace or heating chamber, as shown in Fig. 5. The heat may be obtained in any suitable manner, as for example by electrical heating elements, gas, or the electrical resistance method wherein an electric current is passed directly through the tube to heat the same. However, these details of obtaining the heat do not form a part of the present invention.

The several tubes, A, B and C, are telescoped together, as illustrated in Figs. 6 and 7, and in order to facilitate the telescoping of the tubes they are preferably of such size as to freely pass one within the other, leaving clearances, as shown at X. This, however, is exaggerated in Fig. 7.

With the tubes thus telescoped, they are ready to be drawn to reduce the over all diameter and to bring the contiguous tube surfaces tightly together, thus closing the clearance X. A diagrammatic illustration of this is shown in Fig. 8, wherein a reducing die is shown at 15 and pulling tongs at 16. One end of the structure formed by the telescoping tubes is swedged, as illustrated at 17, for insertion through the die and to be engaged by the pulling tongs. The swedging of the end of the tube structure causes the inner and outer surface of the tubes to tightly engage each other so that all three tubes are drawn along together. As the drawing operation begins the outside pressure furnished with the die 15 reduces the diameter of the outer tube A, thus bringing the inner wall thereof into tight engagement with the outer wall of the intermediate tube B.

As the drawing operation continues this outside pressure coming through tube A reduces the diameter of the intermediate tube B until it comes into tight engagement with the outer wall of the inner tube C, whereupon continuance of the drawing operation effects a drawing action and a reducing action on all three tubes. Thus the adjacent inner and outer walls of the telescoping tubes are brought into extremely firm and tight engagement. This materially facilitates a strong bond therebetween upon the fusing of the copper of the coatings, since the tighter the fit the stronger the copper welded joint.

After the tubes have been drawn, the structure is then subjected to copper melting temperature, as diagrammatically illustrated in Fig. 9. Here the tube, to which the reference characters ABC have been applied, is moved through a heating zone which may be constituted by a furnace 20 and a cooler 21, to which a non-oxidizing or reducing gas may be supplied through the connection 22, and the copper is again rendered molten, with the result that the contiguous surfaces of the tubes A, B and C are copper welded together. The heating apparatus shown in Fig. 9 may be the same as that illustrated in Fig. 5.

The tubing in this form may be considered as completed and may be used for high pressure purposes. However, it may be desirable, and it is thought to be preferable, to further treat the tube to remove therefrom any imperfections or imperfectly shaped portions, especially on the exterior surfaces thereof which may come about as a result of the Fig. 9 welding operation. Accordingly, the welded tubes A, B and C may again be reduced by drawing the same through dies 25, as shown in Fig. 10. And finally, the tube may be annealed by moving the same through a heating zone 26 which may be a furnace heated in any suitable manner. To preserve the exposed copper coatings in the annealing step a non-oxidizing or reducing gas may be supplied to the annealing chamber through an inlet 27. The completed tube may appear substantially as shown in Fig. 3, wherein it will be noted that the wall thickness is relatively great as compared to the outside and inside diameters of the tube. The completed tube is also shown in enlarged cross section in Fig. 1. Inasmuch as the three tubes shown herein are all of the same structure the same reference characters are applied to the different parts of the several tubes. It is not necessary, of course, that the several tubes be of the same structure or that they be of the so-called "Bundy" type. However, where double walled tubes are used, the resultant high pressure tube, made from three telescoping tubes, has six ply walls, with each ply firmly united by a copper welded joint to the adjacent ply or plies. Inasmuch as the copper is capable of being drawn to an extent greater than that of the steel, the joints and seams between the plies, as well also as the joints between contiguous surfaces of the several tubes, are not destroyed by drawing operations.

While the invention is particularly useful in the making of small sized, thick walled, high pressure tubing, it is to be understood, of course, that it is not limited to small tubing or to any tubing size. However, it is thought that a specific example might be given to demonstrate one type of tube which has been made in accordance with the invention. This example is as follows:

The inside tube C was formed with an outside diameter of about .172", and the wall thickness thereof, including both plies, was about .022". This tube was then telescoped into an intermediate tube B having an outside diameter of .250", and an inside diameter of .194", thus accounting for a wall thickness of .028". In order that the tubes may be readily and easily telescoped, a clearance of about .020" to .025", especially where the tubes are long, and in this example they were about 45 feet long, is needed between the outside of the inner tube and the inside of the outer tube. The outside tube A had an outside diameter of .312", an inside diameter of .256", and a wall thickness of .028", and in order to telescope tube B thereinto tube B was drawn down to an outside diameter of about .235". However, it might be pointed out that in commercial practice the original tube sizes should be selected so that no drawing operation would be needed to size the tubes before telescoping them together. This then left a clearance of about .007" between the walls of the tubes C and B, and about .021" between the walls of the tubes B and A. This combined tube structure was then drawn to an outside diameter of about .272", thus closing the clearances between the tubes and effecting one tube structure. This structure was then subjected to heat to copper weld the telescoping tubes together and then was again drawn to finally size the same to an outside diameter of about .250", whereupon the same was annealed. The finished tube had a wall thickness of about .078" and an inside diameter of about .094".

The tube has great strength in many respects, aside from being capable of withstanding abnormally heavy internal pressure. To the eye the several plies of the finished tube, as per the above example, are not visible at the end of a length of tube except by extremely close inspection, so that the tube has the appearance of being a seamless tube formed from a single piece of drawn or pierced metal. When the so-called "Bundy" type of tube is used, the seams or joints, constituted by the off-set 3 and abutting edges 4 and 5, may be disaligned, although the strength of the tube is so great, and each seam or joint is so reinforced that the other tubes or plies may be telescoped into each other without regard to the position of the seams or joints. This is illustrated in Fig. 1 where the seam or joint of the tubes A and B are in fairly close proximity and the seam or joint of the tube C almost diametrically opposite.

Throughout the specification and in some of the claims the word "copper" has been used in describing the sealing metal. As set forth in the early part of the specification copper or a copper alloy may be used. For the purpose of brevity and conciseness the word "copper" was used throughout the specification and claims, but it is to be understood that wherever this term is employed it is the intention to cover copper alloys, or any equivalent metal of a cuprous nature.

I claim:

1. A high pressure tubing comprising, a plurality of tubular members each fashioned from strip metal stock and having overlapping parts, said overlapping parts being united by fused copper, said tubular members having a coating of copper on some of their surfaces, said plurality of tubular members being respectively of varying diameters and telescoped together, with the copper coated surfaces of one tube next adjacent the surface of another, thus forming a multiple ply wall tubular structure, all of said tubular members of the structure being drawn, whereby the metal of the tubular members is extended longitudinally and the members reduced in diameter until the contiguous surfaces are in tight engagement, the copper coatings being fused and said tubular members united thereby.

2. A high pressure tubing comprising, a plurality of tubular members each fashioned from strip steel stock and having overlapping parts, said overlapping parts having a coating of cuprous metal thereon, said tubular members having a cuprous coating on some of their surfaces, said tubular members being respectively of varying diameters and telescoped together, thus forming a multiple ply wall tubular structure with the cuprous coatings forming a cuprous zone between overlapping parts of each tubular member and a cuprous zone between the tubular members, all of said tubular members being drawn, whereby the metal thereof is extended longitudinally and their diameters reduced until the contiguous surfaces are in tight engagement, said cuprous coatings being fused and said overlapping parts and said contiguous surfaces of the tubular members united thereby.

3. A high pressure tubing comprising, a plurality of tubular members each formed from strip steel stock fashioned through substantially 720° into a double ply tubular form, a copper coating on overlapping parts providing a copper zone between the overlapping parts, a copper coating on the surfaces of the tubular members, said plurality of tubular members being respectively of varying diameters and telescoped together, thus forming a multiple ply wall tubular structure, all of the tubular members of the structure being drawn so that the metal of the members is extended longitudinally and the members reduced in diameter until their contiguous surfaces are in tight engagement, said plies of the tubular members and the contiguous surfaces of the tubular members being united by the fusing of the copper coatings.

4. The method of making high pressure tubing which comprises, forming a plurality of independent tubular members each having overlapping parts from strip metal stock, each having a coating of high fusing point sealing metal between the overlapping parts for uniting said parts with a joint having cold working and extension properties which approximates such properties of the strip metal stock, said independent tubular members being of varying diameters so that the outside diameter of at least one tubular member is less than the inside diameter of another, some of the surfaces of the tubular members having a coating of said sealing metal thereon, telescoping the tubular members together by relative lengthwise movement to form a plural ply wall tubular structure with zones of sealing metal between the telescoping tubes and between the overlapping parts thereof, drawing the tubular structure to substantially simultaneously longitudinally extend the metal and reduce the diameters of the tubular members until the contiguous surfaces thereof are in tight engagement, and uniting said overlapping parts of the tubular members and the contiguous surfaces of the tubular members by fusing the said zones of fusing metal.

5. The method of making high pressure tubing which comprises, forming a plurality of tubular members from strip metal stock, each with overlapping parts and said overlapping parts having a copper coating therebetween, said tubular members being of varying diameters so that the tubes may be telescoped together, some of the surfaces of the tubular members having a copper coating thereon, telescoping the tubular members together to form a plural ply wall tubular structure, with the said coating on some of the tube surfaces positioned between the telescoped tubular members, drawing the tubular structure to substantially simultaneously longitudinally extend the metal and reduce the diameters of the tubular members until the contiguous surfaces thereof are in tight engagement, and uniting the overlapping parts of the tubular members and the contiguous surfaces of the tubular members by fusing the copper coatings.

6. The method of making high pressure tubing which comprises, forming a plurality of tubular members from strip steel stock, each with overlapping parts and with a layer of copper between overlapping parts, said tubular members being of varying diameters so that the tubular members may be telescoped together, some of the tubular members having surfaces comprising a layer of copper, telescoping the tubular members together to form a plural ply wall tubular structure with the copper surfaces of a tube contiguous to a surface of the next adjacent tube, drawing the tubular structure to substantially simultaneously longitudinally extend the metal and reduce the diameters of the tubular members until the contiguous surfaces are in tight engagement, uniting the said overlapping parts of the tubular members and the contiguous surfaces thereof by fusing said copper, a second time drawing the tubular structure to further longitudinally extend the same and reduce the diameter thereof, and then heat treating the thus extended structure to anneal the steel.

7. The method of making high pressure tubing which comprises, forming a plurality of tubular members from copper coated strip steel stock, each having overlapping parts, uniting the overlapping parts of the tubular members by fusing the copper, whereby each member becomes a completely sealed tube, said tubular members being of varying diameters so that the members may be telescoped together, telescoping the tubular members together to form a plural ply wall tubular structure, drawing the tubular structure to substantially simultaneously longitudinally extend the tubular members and to reduce the diameters thereof until the contiguous surfaces are in tight engagement, and then heating the tubular structure to again fuse the copper and unite the contiguous surfaces of the tubular members.

8. The method of making high pressure tubing which comprises, forming a plurality of tubular members of varying diameters from copper coated strip steel stock fashioned substantially through 720° to provide tubular members with double ply walls, subjecting each tubular member to heat to melt the copper and fuse the plies together, telescoping the tubular members together to form a plural ply wall tubular structure, drawing the said tubular structure to substantially simultaneously longitudinally extend the tubular members and reduce the diameters thereof until the contiguous surfaces are in tight engagement, and then heating the tubular structure to again melt the copper and fuse the contiguous surfaces of the tubular members together.

BERT L. QUARNSTROM.